United States Patent
Hurlin et al.

(10) Patent No.: US 9,390,704 B2
(45) Date of Patent: Jul. 12, 2016

(54) METHOD OF MANUFACTURING A SOUND ABSORBING PANEL

(71) Applicant: AIRCELLE, Gonfreville l'Orcher (FR)

(72) Inventors: Herve Hurlin, Igny (FR); Pierre Caruel, Le Havre (FR)

(73) Assignee: AIRCELLE, Gontreville l'Orcher ( * ) Notice: Subject to any disclaimer, the term of this patent is extended or adjusted under 35 U.S.C. 154(b) by 0 days.

(21) Appl. No.: 14/245,836

(22) Filed: Apr. 4, 2014

(65) Prior Publication Data

US 2014/0216846 A1 Aug. 7, 2014

Related U.S. Application Data

(63) Continuation of application No. PCT/FR2012/052232, filed on Oct. 3, 2012.

(30) Foreign Application Priority Data

Oct. 7, 2011 (FR) ...................................... 11 59059

(51) Int. Cl.

| | |
|---|---|
| *B64D 15/02* | (2006.01) |
| *B64D 15/04* | (2006.01) |
| *B64D 33/02* | (2006.01) |
| *B32B 3/12* | (2006.01) |
| *B64D 15/00* | (2006.01) |
| *G10K 11/20* | (2006.01) |
| *B64D 29/00* | (2006.01) |
| *B64D 33/00* | (2006.01) |
| *B32B 3/10* | (2006.01) |

(52) U.S. Cl.
CPC ................. *G10K 11/20* (2013.01); *B64D 15/00* (2013.01); *B64D 15/04* (2013.01); *B64D 29/00* (2013.01); *B64D 33/02* (2013.01); *B64D 2033/0206* (2013.01); *B64D 2033/0233* (2013.01); *Y10T 156/10* (2015.01); *Y10T 156/1003* (2015.01)

(58) Field of Classification Search
USPC .......... 181/214, 292, 288; 244/134 C, 134 R, 244/134 B, 134 E; 428/116, 118; 156/197, 156/196, 292
See application file for complete search history.

(56) References Cited

U.S. PATENT DOCUMENTS

| | | | |
|---|---|---|---|
| 2,980,573 A | * | 4/1961 | Clifford ........................ 428/118 |
| 3,106,503 A | | 10/1963 | Randall et al. |
| 3,933,327 A | | 1/1976 | Cook et al. |

(Continued)

FOREIGN PATENT DOCUMENTS

| | | |
|---|---|---|
| EP | 0 913 326 | 5/1999 |
| EP | 1 103 462 | 5/2001 |

(Continued)

OTHER PUBLICATIONS

International Search Report issued Feb. 1, 2013 in International Application No. PCT/FR2012/052232.

*Primary Examiner* — Edgardo San Martin
(74) *Attorney, Agent, or Firm* — Burris Law, PLLC

(57) ABSTRACT

The present disclosure provides a method of manufacturing a sound absorbing panel in which a reflective wall on one of faces of a set of sound absorbing cells. In particular, a passage on a portion of a thickness (E) of the set of sound absorbing cells is formed on an opposite face of the one of the faces, while the passage forming a main channel for a communication between sound absorbing cells and for a circulation of a de-icing fluid.

12 Claims, 3 Drawing Sheets

(56) References Cited

U.S. PATENT DOCUMENTS

| | | | | |
|---|---|---|---|---|
| 4,001,473 A * | 1/1977 | Cook | | 428/116 |
| 4,094,717 A * | 6/1978 | Barr | | 156/197 |
| 4,752,049 A * | 6/1988 | Cole | | 244/134 B |
| 4,957,577 A * | 9/1990 | Huebner | | 156/197 |
| 5,011,098 A * | 4/1991 | McLaren et al. | | 244/134 B |
| 5,337,978 A * | 8/1994 | Fahrner et al. | | 244/134 A |
| 5,421,935 A * | 6/1995 | Dixon et al. | | 156/197 |
| 5,543,198 A * | 8/1996 | Wilson | | 428/116 |
| 5,841,079 A * | 11/1998 | Parente | | 181/214 |
| 6,245,407 B1 * | 6/2001 | Wang et al. | | 428/116 |
| 6,592,078 B2 * | 7/2003 | Porte et al. | | 244/134 B |
| 6,688,558 B2 * | 2/2004 | Breer et al. | | 244/134 R |
| 6,698,691 B2 * | 3/2004 | Porte | | 244/134 B |
| 7,673,832 B2 * | 3/2010 | Meister | | 244/123.1 |
| 7,718,246 B2 * | 5/2010 | Strauss | | 428/118 |
| 7,938,224 B2 * | 5/2011 | Frustie et al. | | 181/214 |
| 8,172,037 B2 * | 5/2012 | Porte et al. | | 181/214 |
| 8,215,585 B2 * | 7/2012 | Gerken et al. | | 244/133 |
| 8,413,922 B2 * | 4/2013 | Porte et al. | | 244/1 N |
| 8,733,501 B2 * | 5/2014 | Porte et al. | | 181/292 |
| 8,959,768 B2 * | 2/2015 | Vauchel et al. | | 29/889.2 |
| 8,960,589 B2 * | 2/2015 | Porte et al. | | 244/1 N |
| 2002/0139899 A1 * | 10/2002 | Porte | | 244/134 B |
| 2008/0044621 A1 * | 2/2008 | Strauss | | 428/108 |
| 2010/0089690 A1 * | 4/2010 | Gantie et al. | | 181/284 |
| 2010/0096213 A1 * | 4/2010 | Frustie et al. | | 181/214 |
| 2010/0181420 A1 * | 7/2010 | Porte et al. | | 244/1 N |
| 2011/0139927 A1 * | 6/2011 | Porte et al. | | 244/1 N |
| 2012/0021168 A1 * | 1/2012 | Tanii et al. | | 428/116 |
| 2012/0090693 A1 * | 4/2012 | Chelin et al. | | 137/15.1 |
| 2012/0318029 A1 * | 12/2012 | Porte et al. | | 72/54 |

FOREIGN PATENT DOCUMENTS

| | | |
|---|---|---|
| EP | 1 232 944 A1 | 8/2002 |
| FR | 2 820 715 A1 | 8/2002 |
| FR | 2 912 781 A1 | 8/2008 |
| FR | 2 917 067 A1 | 12/2008 |

* cited by examiner

METHOD OF MANUFACTURING A SOUND ABSORBING PANEL

CROSS-REFERENCE TO RELATED APPLICATIONS

This application is a continuation of International Application No. PCT/FR2012/052232, filed on Oct. 3, 2012, which claims the benefit of FR 11/59059, filed on Oct. 7, 2011. The disclosures of the above applications are incorporated herein by reference.

FIELD

The present disclosure relates to a method of manufacturing a sound absorbing panel and the sound absorbing panel obtained by the manufacturing method.

BACKGROUND

The statements in this section merely provide background information related to the present disclosure and may not constitute prior art.

The aircraft turbojet engines generate significant noise pollution. There is a strong demand aiming at reducing this pollution, and even more so as the turbojet engines used become more and more powerful. The design of a nacelle surrounding a turbojet engine contributes for a large part to the reduction of this noise pollution.

In order to further improve the aircrafts' sound performances, the nacelles are equipped with sound absorbing panels aiming at reducing the noise transmission generated by the turbojet engine.

Generally, such sound absorbing panels are installed on the nacelle surrounding the turbojet engine in inlet and/or outlet of the fan duct of the turbojet engine.

A nacelle for an aircraft turbojet engine has typically several functionalities such as to maintain the turbojet engine to an attachment engine strut connected to a wing of the aircraft, to reverse the thrust of the turbojet engine, or furthermore, to integrate noise attenuating and de-icing devices.

During a phase of flight of an aircraft, it is common that the climatic conditions in altitude cause a frost build-up in different spots of the aircraft. Frost may for example be formed on the nacelle of the turbojet engine, including the leading edge of said nacelle. Such frost build-up is unacceptable, because it can cause changes in the aerodynamic profile of the nacelle, or can also damage the turbojet engine in the case of extracting blocks of ice formed on the air inlet lip of the nacelle.

It is therefore imperative to equip the nacelle of the turbojet engine with a device preventing the frost and ice build-up on the nacelle.

Such devices are, in known manner, carried out by sampling the hot gases in the compressor of the turbojet engine or by producing them by compression or heating, and by redirecting them on the surface of the nacelle which can be affected by the ice build-up.

A recurring problem is related to the cohabitation of sound absorbing and de-icing devices. Indeed, in general, a sound absorbing panel is located close to the air inlet lip of the nacelle; this has the effect of limiting the functional part of the de-icing device in areas of the nacelle which are not covered by the sound absorbing panel.

EP 0 913 326 provides a solution to this problem through the installation of a "Picolo" tube within the air inlet lip of the nacelle or a system of rotating movement of the de-icing fluid, allowing the injection of a de-icing fluid through the alveolar core structure to form the intermediate layer of the sound absorbing device.

EP 1 103 462 also describes a system of rotating movement of a de-icing fluid, "swirl" tube, which delivers a de-icing fluid passing then through a alveolar core structure of a device of sound processing.

A common drawback with these solutions is that the sound processing is disturbed by this fluid, which causes a malfunction of the sound absorbing device.

We also know U.S. Pat. No. 3,933,327, which provides a de-icing device for an air inlet of a nacelle of a functional turbojet engine at the sound processing zone, thanks to openings provided in the thickness of the alveolar core structure of the sound processing device, these openings allowing to facilitate the passage of a hot gas through the cells of said structure. A major drawback of this solution is the complexity of manufacturing the sound processing device. In fact, the alveolar structure is complex to implement insofar as intended to let the hot gas pass must be implemented on each cell wall.

Finally, FR 2 820 715 describes sound attenuating means formed by a plurality of unconnected islands, between which a hot pressurized fluid flows from a de-icing system of the cowl of air inlet of a turbojet engine. According to these method and device, the performance of the de-icing device is not affected by the sound processing device. However, first of all, the performances of the sound attenuating means are sharply reduced because the sound processing surface is decreased because of corridors arranged in the air inlet lip for the passage of hot pressurized fluid. Then, the integration of sound attenuating means is difficult to accomplish because it is necessary to provide a corridor for hot fluid circulation between two strips of alveolar core structure.

SUMMARY

The present disclosure provides a method and a device of easy manufacturing, for which, once incorporated into a turbojet engine nacelle for example, the performances of the de-icing device are not altered by the presence of the sound absorbing panel, and conversely, the sound absorbing performances of the panel are only few reduced during the functioning of the de-icing device.

To this end, the present disclosure provides a method of manufacturing a sound absorbing panel in which a reflecting wall on at least a portion of one of the faces of a set of sound absorbing cells is provided, characterized in that on the opposite face of said one of the faces, at least one passage on a portion of the thickness of said set is formed, said passage forming at least one main channel for communication between the cells and being intended for the circulation of a de-icing fluid.

The manufacturing method according to the present disclosure allows carrying out in a simple way a sound absorbing panel. Indeed, compared to the prior art, one forms on one side of the set of sound absorbing cells not covered by a reflective skin at least a passage on a portion of the thickness of said set, the methods for making these passages being described hereinafter. We obtain a sound absorbing panel shaped to be able to be particularly integrated in an air inlet lip of a nacelle for an aircraft turbojet engine. The passages form channels called main channels, and are intended for the circulation of a de-icing fluid. According to the present disclosure, said main channels are formed in only a portion of the thickness of the entire sound absorbing cells. By this arrangement, the sound performances of the sound absorbing panel are altered very little. Moreover, when the sound absorbing panel produced by the manufacturing method according to the present disclosure is for example integrated in a nacelle of aircraft turbojet engine, the channels defined on a face of the set of sound absorbing cells provide communication between the cells, so that the de-icing fluid which comes from a de-icing device and which meets the de-icing sound absorbing panel can circulate freely within the set of sound absorbing cells, without however altering its sound performances.

According to another feature of the manufacturing method according to the present disclosure, metal strips are fixed on at least a portion of either the inner or outer walls of the sound absorbing panel, in a direction substantially transversal to that of the main canals.

This arrangement advantageously allows improving the thermal conductivity of the set of sound absorbing cells. This contributes to solving the problems of the prior art related to the good transmission of the thermal energy from the de-icing fluid to the cells of the set of sound absorbing cells.

According to the present disclosure, the set of cells comprises a sound absorbing alveolar core structure comprising a plurality of alveolar cells.

The set of sound absorbing cells can be formed by expansion of at least two sheets bonded together in alternated bonding zones.

The sound absorbing panel according to the present disclosure can be made from a sound absorbing panel known to those skilled in the art, simply by forming passages on one side of said panel, said passages being made by the methods described below. The sound absorbing panel of the present disclosure is shaped to be able to be incorporated in a particular air inlet lip for an aircraft turbojet engine nacelle.

According to the present disclosure, one forms the set of sound absorbing cells by expanding at least two sheets bonded together at reduced bonding zones of partial bonding, so that during the expansion of said sheets, one forms secondary channels substantially transverse to the main channels.

Thanks to such a feature, a circulation is created between the main channels. This allows, when integrating a sound panel made by the manufacturing method according to the present disclosure within a nacelle turbojet aircraft, for example, to substantially increase the area of passage of the de-icing fluid in the sound absorbing panel. Thus, by such a method for producing a set of sound absorbing cell, one improves the transfer of thermal energy of the de-icing fluid between cells. Furthermore, the fact that the secondary channels are transverse with respect to the main channels allows limiting the loss of sound absorbing surface area.

According to the present disclosure, one machines on one side of the set of sound absorbing cells at least one groove forming at least one passage.

With this arrangement, the passages allow traffic a de-icing fluid within the whole set of absorbing sound cells of without changing its functionality and performance. Moreover, said passages forming the communication channels between the cells are formed by a simple grooving process known to those skilled in the art.

According to the present disclosure, one profiles the grooves in lengthwise or in the width direction of the set of cells absorbing sounds.

According to another form of the present disclosure, one profiles the grooves obliquely with respect to the length or width of the entire sound absorbing cells.

According to one characteristic of the present disclosure, the set of sound absorbing cells is by expanding at least two sheets bonded together in zones of reduced bonding forming a partial bonding, so that upon expansion of said sheets, at least one passage forming at least one main channel of communication between cells is formed.

Thanks to this alternate to the formation of passages by grooving process, the passages are formed by the same process which comprises forming the secondary channels, that is to say with expansion of at least two sheets interconnected by reduced connecting areas forming a partial bonding.

According to a variant of the present disclosure, the set of sound absorbing cells comprises open cell sound foam.

Furthermore, the present disclosure also relates to a sound absorbing panel made by the manufacturing method according to the present disclosure.

The present disclosure also relates to a nacelle for a turbojet engine aircraft comprising an upstream section, a middle section and a downstream section, said nacelle being characterized in that at least one section of said nacelle comprises at least one sound absorbing panel according to the present disclosure.

In one form of the nacelle according to the present disclosure, a sound absorbing panel is secured in the outer portion of the air inlet lip of the nacelle, and the nacelle comprises a de-icing device adapted to convey a de-icing fluid from an inlet duct to an outlet chamber of said fluid through at least one main channel of communication between the cells of the set of sound absorbing cells.

With this arrangement, the distribution of the de-icing fluid in the alveolar structure core is made substantially uniform over the entire circumference of the vein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
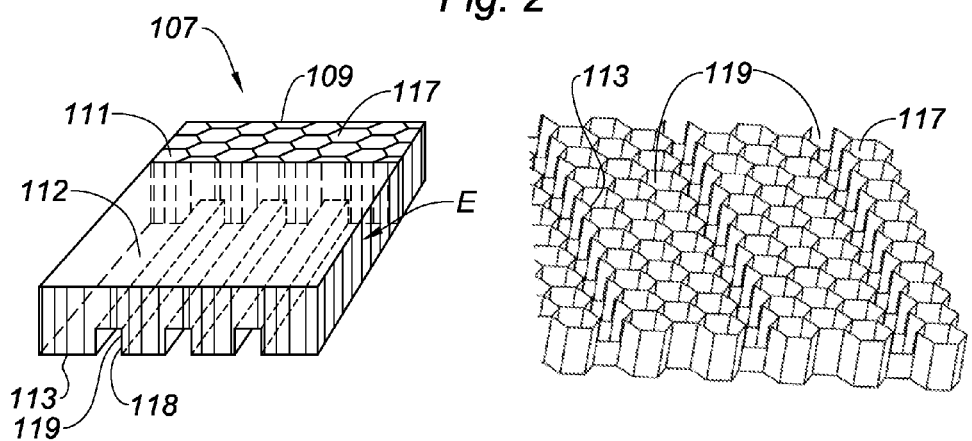
Figure 4:
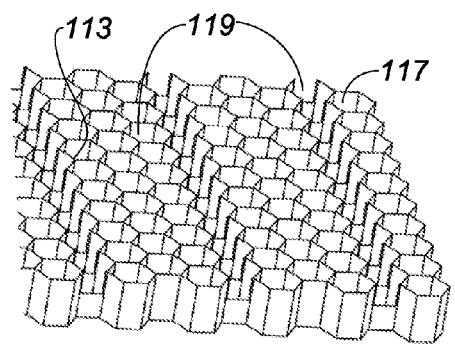
Figure 5:
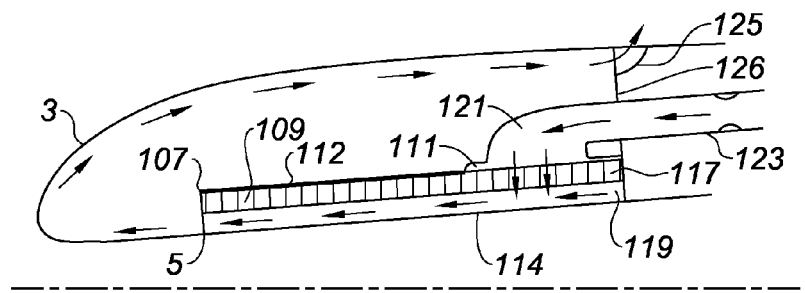
Figure 6:
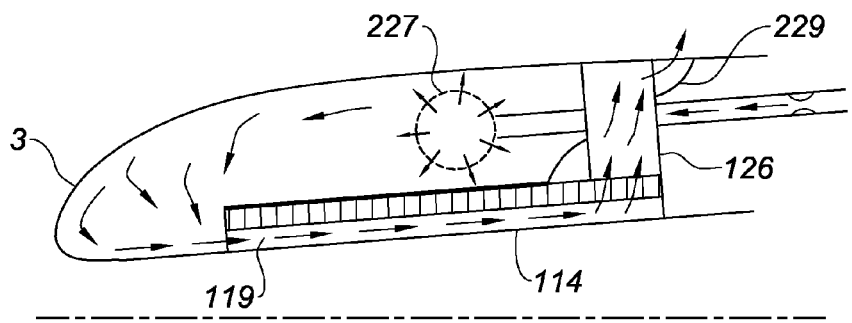
Figure 7:
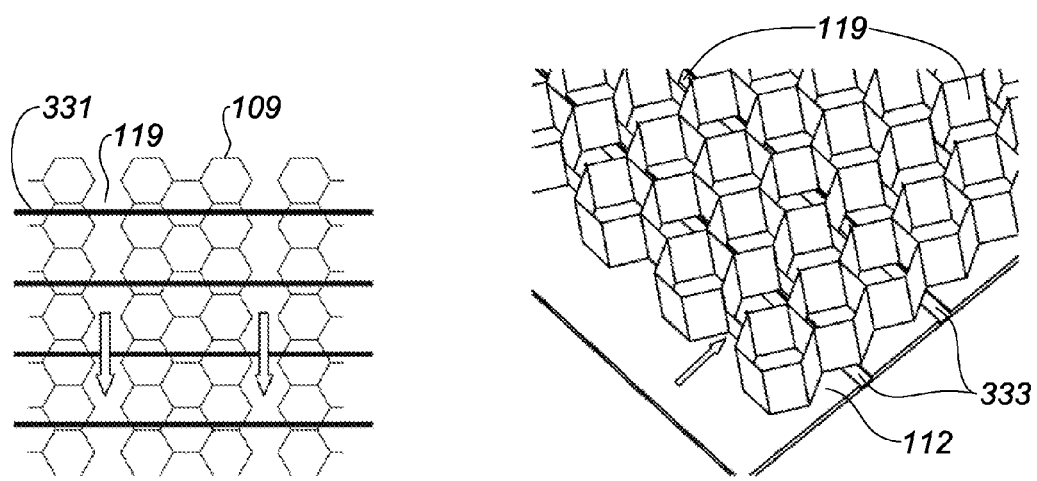
Figure 8:
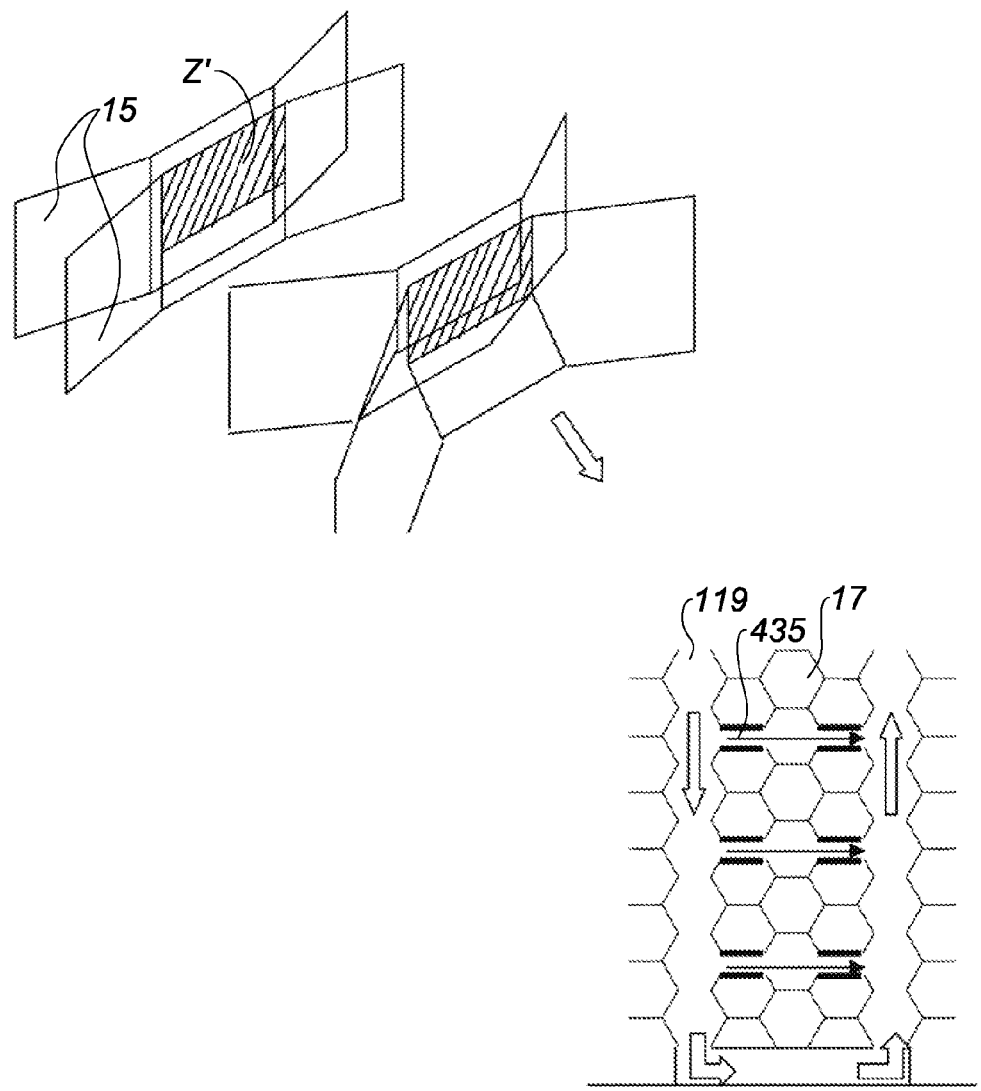

FIG. 3 schematically shows an alveolar core structure according to the present disclosure, in its inner face covered with a reflective wall, and comprising in an outer face communication channels between the alveolar cells;

FIG. 4 is a view similar to FIG. 3, the structure being turned relative to FIG. 3, that is to say, the outer face on which are profiled channels is shown at the top;

FIG. 5 is a sectional view of the upstream section of the nacelle turbojet engine, illustrating the integration of a sound panel according to the present disclosure in said nacelle, and describing the operation according to a first form of the de-icing function;

FIG. 6 is a view similar to FIG. 6, illustrating a second form of the de-icing function;

FIG. 7 shows another form of the alveolar core structure, according to which one adds metal strips on one side of said structure on a wall of sound absorbing panel; and FIG. 8 illustrates the method for producing the alveolar core structure according to another form of the channels, the channels being able, as shown, to provide a secondary flow relative to the primary channels described in FIGS. 3 and 4.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present disclosure, one uses the terms "upstream", "middle" and "downstream" and refer to the sections of the nacelle, the upstream section corresponding to the upstream leading edge of the nacelle and the downstream section corresponding to the trailing edge of said nacelle.

Figure 1:
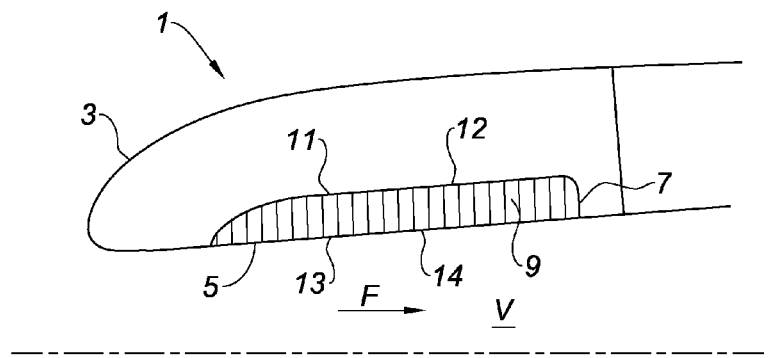
FIG. 1 shows a sectional view of a nacelle for a turbojet engine provided in its upstream part of a sound absorbing panel.

FIG. 1 illustrates schematically the upstream section, partly shown, of a nacelle 1 for an aircraft turbojet engine. Such an upstream section comprises an air inlet lip 3 of the nacelle 1, provided in its outer part 5 of a sound absorbing panel 7 intended for acoustically attenuating the noise and vibration generated by the turbojet of the aircraft.

As is known, a sound absorbing panel includes at least one set of sound absorbing cells, providing sound processing, on the inner face 11 of which is fixed an inner wall 12 and the outer surface 13 on which is fixed an outer wall 14.

Referring to FIG. 1, a set of sound absorbing cells is formed by an alveolar core structure 9, but may be entirely constituted by an open communicating cells foam-like porous structure (not shown). Such foam may be polyurethane or metal for example.

The inner wall 12 is fixed by any means known to the skilled person in the art, for example by gluing. This is a reflective wall, generally constituted by a skin forming a reflector or by a septum. It defines the end of the sound processing area.

The outer wall 14 is typically formed by a perforated skin and is able to let pass the sound waves to be attenuated, coming from the vein "V" of the circulation of air flow "F" to be acoustically mitigated.

The sound absorbing panel 7 is conventionally fixed to the lip of the air inlet 3 of the turbojet engine of the nacelle 1 such that it withstands high temperatures generated during a de-icing operation performed by a not shown de-icing device. Typically, the sound absorbing panel 7 can be glued, soldered or welded to the air inlet lip 3 of the nacelle, the attachment may be on any surface of the alveolar material or partial.

Typically, an air inlet lip of nacelle for a turbojet engine is metallic or in any other material known to those skilled in the art, having good heat resistance and a thermal conductivity sufficient to provide de-icing of said lip.

Figure 2:
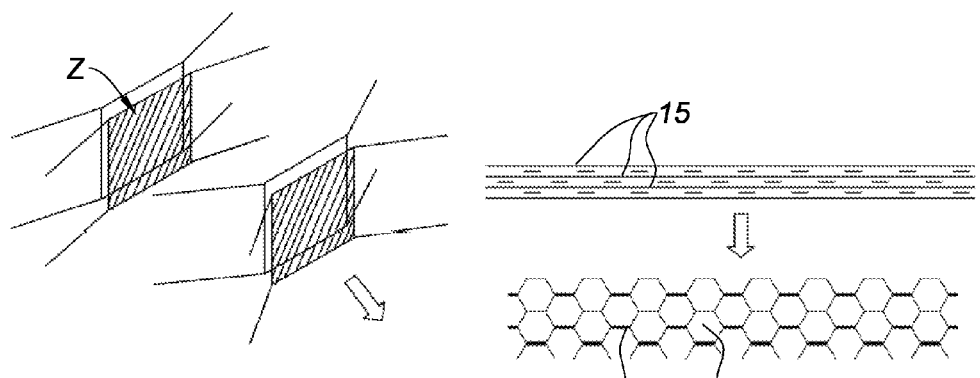
FIG. 2 illustrates the method of manufacturing an alveolar core structure.

In a known manner, and with reference to FIG. 2, an alveolar core structure 9 is obtained by a method of extending the sheets 15 bonded together by gluing, soldering or welding in alternating bonding areas "Z", so as to form a plurality of alveolar cells 17, said alveolar cells forming then the cells of the sound absorbing cells set.

Such an alveolar structure core may be manufactured in a metal alloy, such as aluminum or titanium, or in a material such as Nomex® which corresponds to a polyamide fibers and phenolic resin-based paper.

In the case where the set of sound absorbing cells is realized by a sound foam (not shown) as described above, the sound absorbing cells are formed by open cavities forming cavities of said foam, said cells being formed by air bubbles being interconnected between each other.

One refers now to FIGS. 3 and 4. According to the present disclosure, after the step of forming the alveolar core structure such as previously described in FIG. 2, one fixes a reflective wall 112 on one of the faces 111, 113 of the alveolar core structure 109.

The reflecting wall 112 occupies only a portion of the internal face of the alveolar core structure 109, so as to leave access to said structure to allow entering or leaving of a de-icing fluid as described below.

The reflecting wall 112 is fixed to the inner face 111 of the alveolar core structure 109 by any method known to those skilled in the art, as described above.

Once the reflective wall 112 is attached, one forms, on the surface 113 opposite to the face 111, passages 118 on only a portion of the thickness "E" of the alveolar core structure 109.

Such passages are formed by a known machining method such as a grooving process, through which one forms one or more grooves 119 on the face 113 of the alveolar core structure 109 not covered by the reflective wall 112. These passages 118 form main communication channels between the cells and are intended for the circulation of a de-icing fluid.

Furthermore, these passages 118 also may be formed during the formation of the alveolar core structure 109 at the expansion stage in leaves, as described below.

The grooves 119 are formed in the length direction of the alveolar core structure 109.

The grooves 119 may also be performed either in the width direction of the alveolar core structure 109, or inclined with respect to the length or width of the alveolar core structure 109.

The grooves 119 then enable communication between two alveolar cells 117, and thus form channels, called main channels, suitable and intended for the circulation of a de-icing fluid, the operation of which is described below.

The set constituted by the inner skin 112 and the structure 109 thus formed is then intended for assembly with a perforated outer skin (not shown) allowing passage of an air flow "F" to be acoustically mitigated when the sound absorbing panel 107 thus formed is incorporated into a turbojet engine nacelle.

One refers now to FIG. 5, illustrating an air inlet lip 3 of a nacelle for a turbojet engine provided with a sound absorbing panel 107 produced by the method according to the present disclosure and a de-icing device.

The air inlet lip 3 comprises in its outer part 5 a sound absorbing panel 107 made by the method according to the present disclosure.

Furthermore, according to the present disclosure, the nacelle is equipped with a de-icing device which carries a de-icing fluid from the compressor of the turbojet engine (not shown) or any other hot compressed air generator, to a de-icing chamber 121 substantially annular-shaped and directly connected to the inner face 111 of the alveolar core structure 109, in the downstream portion of the sound absorbing panel 107.

Thanks to this arrangement, the distribution of the de-icing fluid in the alveolar core structure 109 is made substantially uniform over the entire circumference of the vein.

The alveolar cells 117 of the alveolar core structure 109 open into the main channel 119 located in the outer face 113 of said structure.

During a de-icing operation, the de-icing fluid flows from an inlet conduct 123 connected to the compressor of the turbojet engine (not shown) into the alveolar cells 117 of the structure 109 before reaching the main channels 119.

The de-icing fluid then flows through the main channel, which has the effect of creating a good heat transfer and a good thermal energy distribution to the alveolar cells of the structure.

When the de-icing fluid reaches the end of a channel 119, it enters the interior of the air inlet lip 3 of the nacelle 1, then is redirected by the wall of said lip 3 to a discharge chamber 125 substantially annular and open towards the outside of the nacelle, allowing said fluid to escape. Typically, the discharge chamber is located at the closing wall 126 of the air inlet lip 3.

Thanks to the main channels, the de-icing fluid can travel the alveolar core structure without obstructing the alveolar cells. Thus, the sound absorbing performance of the sound absorbing panel is not altered during operation of the de-icing device and the passage of the de-icing fluid in the alveolar core structure.

It will also be possible not to pierce the outer wall 114 in right of the main channels 119 in order to avoid the injection of hot air into the engine, at the detriment of the treated surface and thus of the sound attenuating.

One refers now to FIG. 6, illustrating a variant of de-icing fluid distribution, according to which one fixes in the air inlet lip, as described above, a sound absorbing panel produced by the method according to the present disclosure, but the distribution of the de-icing fluid of which is performed via a Picolo tube 227, arranged in the air inlet lip 3 of the nacelle 1.

The Picolo tube is, in a known manner, connected to an inlet pipe of the de-icing fluid, and then diffuses through a plurality of ports (not shown) the de-icing fluid directly inside the air inlet lip 3.

The de-icing fluid then enters, as shown, directly into the main channel 119 of the alveolar core structure 109.

The de-icing fluid passage through these channels 119 is formed by channeling discharge thereof to a substantially annular discharge chamber 229 and opening to the outside of the nacelle. The discharge chamber is installed for example at the closure wall 126 of the air inlet lip 3.

According to another variant not shown, the distribution of the de-icing fluid can also be achieved by a gas rotation system (tube "swirl").

Referring now to FIG. 7, illustrating another form of the sound absorbing panel, wherein the sound absorbing panel 107 made by the manufacturing method according to the present disclosure as described above is provided with metal strips 331 which are fixed on the inner wall 112 of the panel.

These metal strips 331 may of course be attached to the outer wall 114 of the sound absorbing panel 107.

The metal strips 331 are disposed in a substantially transversal direction to that of the main channel 119 of the alveolar core structure 109.

The metal strips 331 extend along the entire or a part of the length of the inner wall 112 or 114 of the outer panel 107 onto which they are fixed.

These metal strips may be fixed during the soldering phase of the alveolar core structure or, once the alveolar structure has been produced by the method according to the present disclosure, by other means such as, for example, by welding or by electroplating.

In order to better integrate these metal strips, it can be expected to provide grooves 333 on the inner wall 112 of sound absorbing panel 107. These grooves can of course be formed on the outer wall 114 of said panel.

These metal strips 331 are made of a material having good thermal conductivity properties, and are necessarily in a more conductor material than that used for the walls 112, 114 of sound absorbing panel 107.

Thanks to this variant, the thermal conductivity is increased transverse to main channels 119 of the alveolar core structure 109.

One refers now to FIG. 8 which discloses a further form of the alveolar core structure 109.

As described above with reference to FIG. 2, one carries out conventionally an alveolar core structure through a known method which consists in extending the sheets 15 bonded, soldered or welded together in alternating bonding areas "Z", so as to form a plurality of alveolar cells 17.

According to the form shown in FIG. 8, one only partially bonds a part of the height of an alveolar cell 17 on a connecting region "Z'", called reduced, forming a partial bonding so that is created, during the expansion phase, a flow section thus forming channels.

When we apply the manufacturing method according to the present disclosure to this structure 109, wherein the main channels 119 are formed by the grooving process, said channels then formed by partial bonding during the expansion phase of the alveolar core structure form secondary channels 435.

These channels 435 are transversal to the main channels created by the grooving process.

With this arrangement, one creates a circulation between the main channels 119, which has the result of increasing the surface subjected to de-icing fluid.

Furthermore, the fact that the secondary channels are transverse to main channels 119 allows limiting the loss of the sound surface of the surface sound absorbing panel.

According to a variant not shown in the figures, the method of expansion of the sheets 15 by partial bonding can also be used to form the main channels 119.

As a matter of fact, according to this variant, one does not realize the method of grooving as defined above, but the passages between the alveolar cells are achieved through partial bonding between the sheets that then form channels for communication between said alveolar cells during the phase of expansion.

Thanks to the manufacturing method according to the present disclosure, one is able to achieve an effective sound absorbing panel in a simple way, on one hand, to reduce the noise transmitted from the fan into the air inlet channel and, on the other hand, not to affect the operation of a de-icing device required on all aircraft turbojet engine nacelle.

Moreover, thanks to other features of the method of manufacturing such a sound panel, one knows now how to substantially increase the passage area of the de-icing fluid in the sound absorbing panel without degrading its sound performances.

It goes without saying that the present disclosure is not limited to the only forms of the sound panel and of the nacelle that integrate this sound panel, described above as examples, but it encompasses all the variants.

What is claimed is:

1. A method of manufacturing a sound absorbing panel in which a reflective wall on at least a portion of one of faces of a set of sound absorbing cells is provided, wherein on an opposite face of said one of the faces at least one passage on a portion of a thickness (E) of said set of sound absorbing cells is formed, said at least one passage forming at least one main channel through which the sound absorbing cells communicate with each other and a de-icing fluid circulates through the sound absorbing cells, wherein the set of sound absorbing cells is formed by expanding at least two sheets bonded together in reduced bonding areas (Z') forming a partial bonding along an entire length of adjacent webs of the cells, such that upon expansion of said at least two sheets, said at least one passage is formed, thereby forming said at least one main channel of fluid communication between the sound absorbing cells for circulation of the de-icing fluid.

2. The method of manufacturing a sound absorbing panel according to claim 1, wherein metal strips are fixed over at least a portion of an inner wall or an outer wall of the sound absorbing panel, in a direction substantially transverse to that of the main channel direction.

3. The method of manufacturing a sound absorbing panel according to claim 1, wherein said set of sound absorbing cells comprises an alveolar core structure comprising a plurality of alveolar cells.

4. The method of manufacturing a sound absorbing panel according to claim 1, wherein the set of sound absorbing cells is formed by expanding at least two sheets bonded together in bonding alternating zones (Z).

5. The method of manufacturing a sound absorbing panel according to claim 1, wherein upon expansion of said at least two sheets, secondary channels are formed substantially transverse to said at least one main channel.

6. The method of manufacturing a sound absorbing panel according to claim 1, wherein one machines on one of the faces of the set of the sound absorbing cells at least one groove forming said at least one passage.

7. The method of manufacturing a sound absorbing panel according to claim 6, wherein said at least one groove is profiled in a length direction or in a width direction of the set of the sound absorbing cells.

8. The method of manufacturing a sound absorbing panel according to claim 6, wherein said at least one groove is profiled inclined with respect to a length or a width of the set of sound absorbing cells.

9. The method of manufacturing a sound absorbing panel according to claim 1, wherein the set of sound absorbing cells comprises a sound open-cell foam.

10. A sound absorbing panel made by the method of manufacturing according to claim 1.

11. A nacelle for aircraft turbojet engine comprising an upstream section forming an air inlet lip of an air flow "F" to mitigate acoustically, a middle section and a downstream section, wherein at least one section of said nacelle comprises at least one sound absorbing panel according to claim 10.

12. The nacelle for an aircraft turbojet engine according to claim 11, wherein the sound absorbing panel is fixed in an outer part of the air inlet lip, and said nacelle comprises a de-icing device adapted to track a de-icing fluid from an inlet conduit to a discharge chamber of said de-icing fluid through at least one main channel of communication between said sound absorbing cells.

* * * * *